June 15, 1937. H. C. WHITE 2,083,625
METHOD OF DEPOSITING FORAMINATE BEDS AROUND WELL CASINGS
Filed July 1, 1935 2 Sheets-Sheet 1
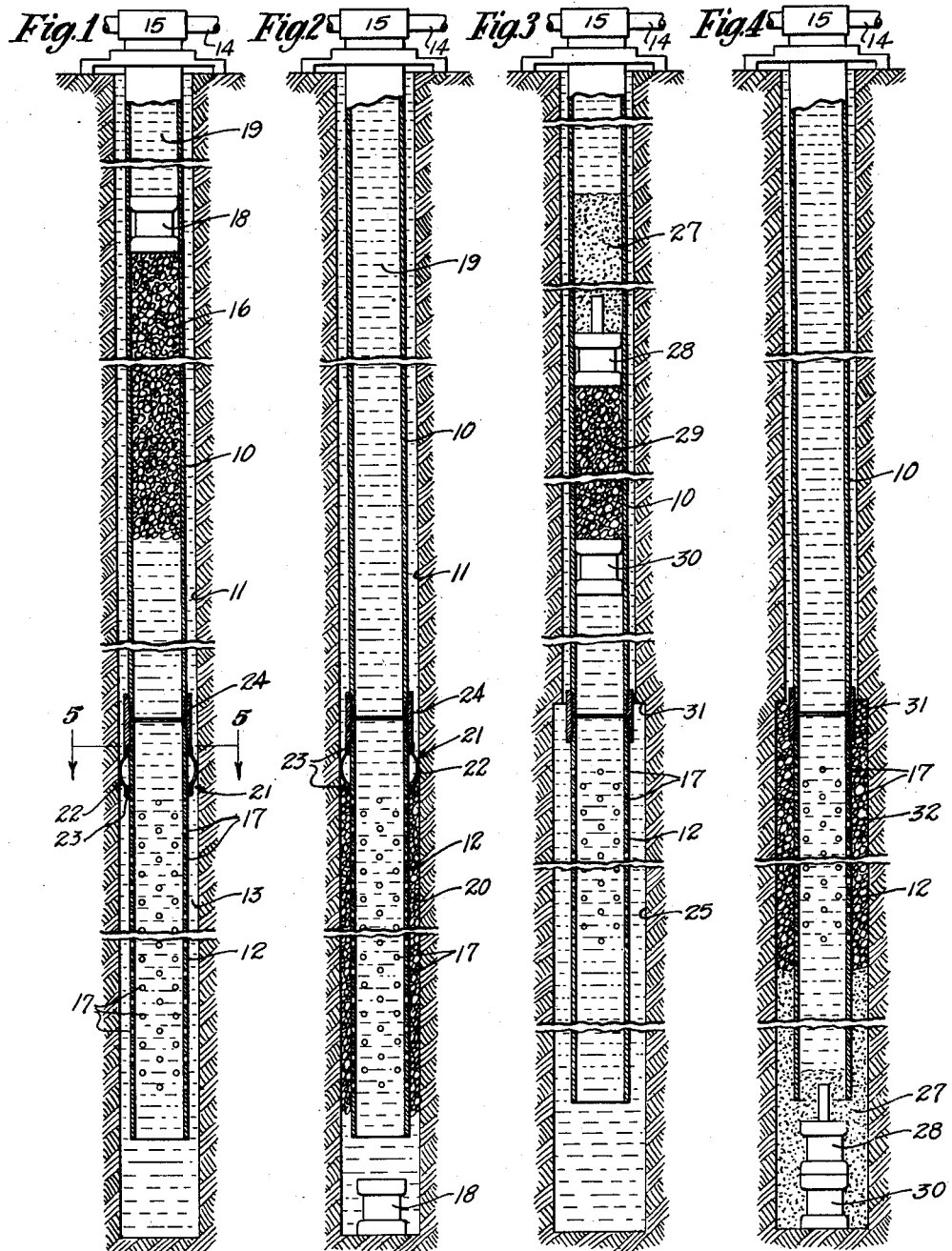
Inventor
Harry Calvin White.
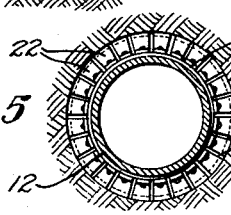
Attorney.

June 15, 1937.  H. C. WHITE  2,083,625
METHOD OF DEPOSITING FORAMINATE BEDS AROUND WELL CASINGS
Filed July 1, 1935   2 Sheets-Sheet 2
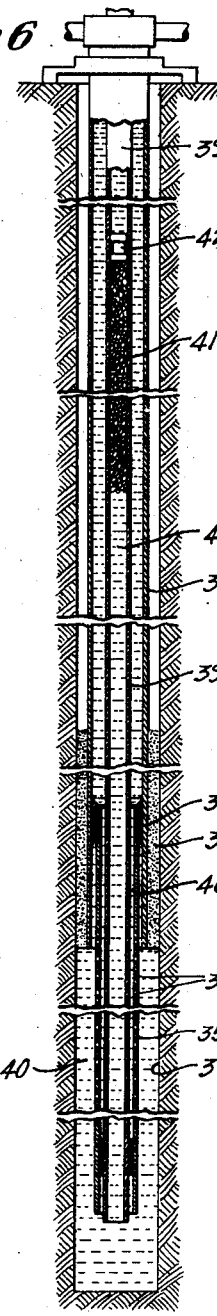
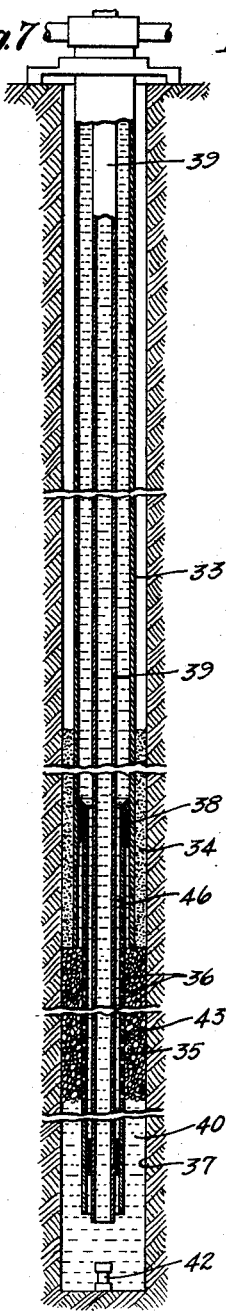
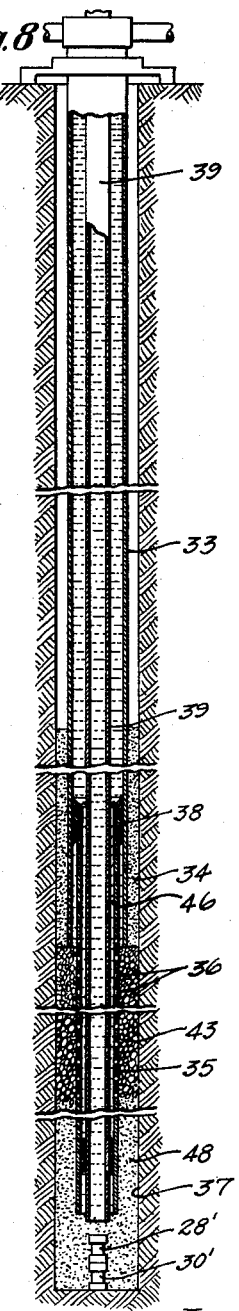
Inventor
Harry Calvin White.
Attorney.

Patented June 15, 1937

2,083,625

UNITED STATES PATENT OFFICE 2,083,625

METHOD OF DEPOSITING FORAMINATE BEDS AROUND WELL CASINGS

Harry Calvin White, Los Angeles, Calif., assignor to John Grant, Los Angeles, Calif.

Application July 1, 1935, Serial No. 29,223

13 Claims. (Cl. 166—21)

This invention has for its general purpose to prolong the normal productive life of oil wells by preventing or retarding the accumulation of clogging sand particles in the perforations of the casing or flow pipe, and in its more specific general aspect has for its object to provide a method for placing between the oil sand and the outside of the perforated section of the casing or flow pipe, after the latter has been lowered to the production zone, a foraminate filtering medium.

According to present practice, the perforated section of the casing, referred to as the well screen, is lowered into the oil sand strata, and when the casing is finally set and the well brought into production, the oil sand becomes more or less packed around and against the screen to an extent depending upon the looseness and other characteristics of the sand formation. The sand directly contacts the outside of the screen, with the result that the sand particles immediately gain access to the screen perforations and, as the well continues in production with the oil flowing in through the perforations, the sand gradually clogs them to the extent that a perforation cleaning operation becomes necessary. Such operations however involve considerable expense and loss of time and production. They also involve a certain amount of serious risk because of the possibility of the screen being collapsed as a result of the suddenly applied pressure differential induced by the cleaning apparatus to create an inward flow of well fluid through the perforations to remove the clogging particles.

Heretofore, to my knowledge, no particular attention has been paid to the possibility of so conditioning the well at the outset that premature clogging of the screen perforations might be avoided and the productive life of the well greatly extended, or at least the time when the cleaning operation becomes necessary might be greatly extended. This invention has been made therefore with the view of placing a protective medium (protective in the sense that it retards clogging of the screen apertures) about the casing or screen when the latter has first been set, as distinguished from the past practice of removing perforation obstructions after the well has been in production. In accordance with the present method, the screen is lowered to the proper depth in that portion of the well bore within the oil sands, with a substantial space provided between the screen and the wall of the bore. A filtering medium is then placed in the space surrounding the screen, preferably by being passed downwardly through the casing or well pipe and deposited upwardly around the screen after being discharged from the lower end of the pipe.

I may use as the filtering medium, various materials capable of forming, when deposited around the screen, a foraminate bed, and which by reason of their low specific gravity may be deposited by maintaining a flow of circulating fluid from the lower end of the casing upwardly around the screen. Preferably the material to form the foraminate filter bed will consist of particles or pieces generally corresponding in size to a coarse gravel, and having a specific gravity preferably less than that of the circulating fluid, or at least not substantially greater, in order that this so-called light weight gravel may be flowed or floated upwardly into position around the screen after being discharged into the well below the screen.

As is commonly known, circulating fluid used in well drilling operations is heavily loaded with mud for the purpose of giving the fluid a high specific gravity. For my purposes, I have only to select from various known materials, a material having the desired size and necessary strength to avoid crushing, with sufficiently low specific gravity that it will float in the circulating fluid, or at least be carried upwardly into position around the screen by the velocity of the rising stream of circulating fluid. As typical of light weight materials suitable for my purposes, I may refer to the low density slags, light weight clay aggregate frequently used in concrete, low density ceramic compositions, wood, or light weight synthetic organic compositions. For convenience of terminology, I will hereinafter refer to the material used for forming the foraminate filter bed, as "gravel" with the understanding however that the term is intended to include any suitable material of the classes or types to which I have just referred.

The invention also contemplates the performing of cementing operations, wherever necessary, in conjunction with the above mentioned method of placing the filter bed around the screen. For example the casing may be cemented above the oil sands and the foraminate bed then placed below the cemented section, and in addition, or as an alternative, the casing may be cemented below the foraminate bed after the latter has been deposited. As will later appear, the present method lends itself to various possible combinations or sequences of gravel depositing and cementing operations.

All the above mentioned features of the invention, as well as various additional objects and details thereof may be understood to best advantage from the following detailed description of certain typical and illustrative operations involving my improved methods. For purposes of description, reference is made to the accompanying drawings which illustrate diagrammatically the sequential operations involved. In the drawings:

Fig. 1 is a sectional view showing a body or column of the light weight gravel being forced downwardly through the well casing;

Fig. 2 is a view similar to Fig. 1, showing the gravel deposited around the screen or perforated section of the casing;

Figs. 3 and 4 are views similar to Figs. 1 and 2, showing corresponding stages in a combined gravel depositing and cementing operation;

Fig. 5 is an enlarged section on line 5—5 of Fig. 1;

Figs. 6 and 7 are views showing sequential operations in depositing the gravel below a previously cemented casing; and Fig. 8 is a view similar to Fig. 7, illustrating a further variational operation.

In the drawings, I show a string of casing 10 lowered within the well bore 11, the casing carrying on its lower end the usual perforated section or well screen 12. Here the well bore is shown to have a somewhat larger diameter than the casing in order that the space 13 surrounding the screen 12 may first be thoroughly flushed by circulating fluid pumped through inlet 14 of the head 15 down through the string of casing and upwardly around the outside of the casing. Also the diameter of the well bore surrounding the screen 12 is sufficiently large to provide ample space at 13 to accommodate a quantity of the light weight gravel necessary to give a filtering medium of necessary thickness.

After any loose sands in space 13 have been washed away by the flushing operation, the casing head 15 is removed and a quantity of gravel 16, in amount sufficient to occupy substantially the entirety of space 13 opposite the perforations 17, is put into the casing 10 and a plug 18 inserted on top of the gravel 16. The head 15 is then replaced on the casing and the column of gravel 16 forced down through the casing and out its lower end by circulating fluid 19 pumped into the casing above the plug 18. As illustrated in Fig. 1, by reason of the low specific gravity of the gravel, the latter floats in the column of circulating fluid within the casing and the buoyancy of the gravel column 16 keeps it against the plug 18 until forced out of the casing.

As shown in Fig. 2, circulating fluid is pumped into the casing above the plug 18 until the entire column of gravel 16 is forced out into the well and the plug discharged from the lower end of the casing. As the gravel is discharged from the casing it is carried or floated upwardly around the screen 12 by the circulating fluid and deposited in a foraminate bed 20 filling the space 13 and separating the screen from the sand at the wall of the well bore. Any suitable means may be provided for preventing the gravel from rising above a predetermined level with relation to the screen 13. As typical, I have shown a barrier, generally indicated at 21, comprising a plurality of circularly spaced, bowed spring elements 22 attached to collars 23 placed about the casing below coupling 24. The spaces 22a between elements 22, and also any clearance between the barrier 21 and the wall of the well bore, are sufficiently small to arrest upward movement of the gravel, without however closing the space around the casing against the upward flow of circulating fluid. Instead of using such means as a barrier on the casing itself for predetermining the level of the gravel bed 20, the diameter of the lower portion of the well bore containing the screen 13 may be enlarged by an underreaming operation, as illustrated at 25 in Figs. 3 and 4, leaving a comparatively small clearance space at 26 between the casing and the upper portion of the well bore.

The thickness of the foraminate bed 20 about the well screen will be sufficient to present an effective barrier that will prevent the well sand from packing tightly against the screen, and which by reason of the coarse gravel-size of the material making up the filter medium, will have sufficient interstitial porosity to readily pass the well liquid flowing into the casing. In this same connection it may be observed that the comparatively coarse consistency of the gravel will prevent it from becoming packed to the extent of diminishing its porosity below a necessary maximum, whereas the oil sand, because of its fineness, packs more readily so as to impair its own porosity as well as to obstruct the screen perforations.

If desired, I may readily cement the screen or casing below the screen perforations by flowing a charge of cement introduced into the casing 10 above the gravel, upwardly around the bottom of the casing below the filter bed 20. In this cementing operation, the cement may be pumped down through the casing immediately following the column of gravel, or the cement may be placed in a subsequent and entirely separate cementing operation. To illustrate the first mentioned method, in Fig. 3 I have shown a measured quantity of cement 27 to be pumped into the casing on top of the plug 28 separating the cement from the gravel 29. In this view I have also shown a second plug 30 below the gravel 29 in order to illustrate that wherever necessary or desirable, (and this also applies to Fig. 1) the gravel may be preceded by a plug. The bodies of gravel and cement are then forced down through the casing and discharged sequentially from its lower end, the gravel rising within space 25 in advance of the cement to the upper end of the underreamed bore 31 to the deposit in a bed 32, and the cement flowing upwardly about the bottom portion of the casing below the gravel. The cement is then allowed to set and harden, as in the usual well cementing operation.

Figs. 6 and 7 illustrate a method whereby the well may be cemented around the casing or flow pipe above the gravel filter bed. Here the casing 33 is first lowered into the well and a body of cement 34 placed around the bottom portion of the casing by any of the usual well cementing methods. The well bore 37 is then drilled and extended below the cemented portion of the bore and enlarged beyond the diameter of the casing 33 by an underreaming operation. Next, a liner 35 having perforations 36 is run down within the casing to substantially the position illustrated, in which it forms, in effect, an extended screen portion of the casing. The space between the liner 35 and casing 33 is closed by a suitable packer 38 carried on the upper end of the liner. The string of pipe 39 is then lowered through the casing and liner for the purpose of conducting the gravel into the well below the liner and into the liner surrounding space 40.

A measured quantity of gravel 41 is put into the pipe 39 above a column 45 of circulating fluid, followed by plug 42, and the gravel and plug forced down through the pipe and out its lower end by circulating fluid pumped into the pipe 39 above the plug. As the plug 42 and gravel 41 are forced downwardly, the fluid column 45 is discharged into the well and circulated upwardly through the liner perforations 36 and space 46 between the liner and pipe 39, into casing 33 above the packer 38. As in the previously described operations, the gravel, upon being forced out the lower end of the pipe 39, is deposited upwardly within space 40 to form a foraminate bed 43 separating the liner perforations from the well sands. The circulation of fluid upwardly through the gravel and into the casing via perforations 36 and space 46 may be continued as long as is necessary to insure that all the gravel will be flowed or floated into position.

In Fig. 8 I have shown how, if desired, the well may be cemented both above and below the gravel filter bed. The method followed is the same as that just described with reference to Figs. 6 and 7, except that after the gravel 43 is deposited around the perforated liner, the bottom portion of the liner is cemented off by a body of cement 48 pumped down through the pipe string 39. The cement 48 may be deposited by the same type of sequential operation illustrated in Fig. 3, that is by pumping down through the pipe 39 a column of gravel immediately followed by a column of cement, or the cement 48 may be deposited by an entirely separate cementing operation after the gravel bed 43 has been placed around the liner.

I claim:

1. The method that includes, passing a body of gravel-size material downwardly within a well pipe by pressure applied to a column of circulating fluid, depositing said material around the outside of a section of pipe spaced from the well bore, and flowing the circulating fluid upwardly from said material to the ground surface through an unobstructed annular space between said pipe and the well bore wall.

2. The method that includes, passing a body of gravel-size material downwardly within a well pipe by pressure applied to a column of circulating fluid, flowing said material from the lower end of the pipe upwardly around a perforated section of the pipe spaced from the well bore, and flowing the circulating fluid upwardly from said material to the ground surface through an unobstructed annular space between said pipe and the well bore wall.

3. The method that includes, passing a body of gravel-size material followed by a plug, downwardly within a well pipe by pressure applied to a column of circulating fluid, discharging said material and plug from the lower end of the pipe, floating said material in the circulating fluid upwardly around a section of perforated pipe spaced from the well bore, and flowing the circulating fluid upwardly from said material to the ground surface within a space surrounding said pipe and directly adjacent the well bore wall.

4. The method that includes, passing bodies of cement and gravel-size material downwardly within a well pipe, discharging said bodies from the same opening at the lower end of said pipe and depositing them, one above the other, around the outside of a section of pipe spaced from the well bore.

5. The method that includes, passing bodies of cement and gravel-size material simultaneously and downwardly within a well pipe, discharging said bodies from the lower end of said pipe and depositing them, one above the other, around the outside of a section of pipe spaced from the well bore.

6. The method that includes, passing bodies of cement and gravel size material downwardly within a well pipe by pressure applied to a column of circulating fluid, discharging said bodies from the same opening at the lower end of said pipe and depositing them, one above the other, around the outside of a section of pipe spaced from the well bore, said material having a specific gravity not substantially greater than the specific gravity of the circulating fluid.

7. The method that includes, passing bodies of gravel-size material and cement downwardly within a well pipe, discharging said bodies from the lower end of the pipe, depositing said material around the outside of a perforated section of well pipe spaced from the well bore, and depositing the cement in a space surrounding the pipe directly below said gravel-size material.

8. The method that includes, placing a tubular perforated liner within the lower end of a well casing and projecting said liner into the well bore below the casing to provide a space between the liner and the well bore wall of greater width than the space between said casing and the bore wall, passing a body of gravel-size material downwardly through the casing and discharging said material in a stream of circulating fluid from within the liner into the space between the liner and the well bore wall, and passing the circulating fluid straight upwardly to the ground surface from said material through an open space between the casing and the well bore wall.

9. The method that includes, placing a tubular perforated liner within the lower end of a well casing and projecting said liner into the well bore below the casing to provide a space between the liner and the well bore wall of greater width than the space between said casing and the bore wall, forming a barrier between the lower portion of the casing and the well bore wall, passing a body of gravel-size material downwardly through the casing and discharging said material in a stream of circulating fluid from within the liner into the space between the liner and the well bore wall, and passing the circulating fluid straight upwardly to the ground surface from said material through an open space between the casing and the well bore wall.

10. The method that includes, enlarging the diameter of the lower portion of a well bore substantially in excess of the diameter of that portion of the bore immediately above, lowering a well casing into said enlarged portion of the well bore, passing a body of gravel-size material downwardly through the casing by pressure applied to a column of circulating fluid, said material being sufficiently light to float in the circulating fluid, flowing said material upwardly from the bottom of said casing into the space between the casing and the wall of said enlarged diameter portion of the well bore, and passing the circulating fluid straight upwardly to the ground surface from said material through an open space between the casing and the well bore wall.

11. The method that includes, enlarging the diameter of the lower portion of a well bore substantially in excess of the diameter of that portion of the bore immediately above, lowering a well casing into said enlarged portion of the well bore, passing a body of gravel-size material downwardly through the casing by pressure applied to a column of circulating fluid, flowing said material upwardly from the bottom of said casing into the space between the casing and the wall of said enlarged diameter portion of the well bore, and arresting upward movement of said material at the upper end of the last mentioned space by virtue of the reduced clearance between the pipe and the well bore above said enlarged diameter portion.

12. The method that includes, enlarging the diameter of the lower portion of a well bore substantially in excess of the diameter of that portion of the bore immediately above, lowering a well casing into said enlarged portion of the well bore, passing a body of gravel-size material downwardly through the casing by pressure applied to a column of circulating fluid, flowing said material upwardly from the bottom of said casing into the space between the casing and the wall of said enlarged diameter portion of the well bore, and flowing the circulating fluid upwardly from said material within the space between the casing and the well bore wall above said enlarged diameter portion of the bore.

13. The method that includes, enlarging the diameter of the lower portion of a well bore substantially in excess of the diameter of that portion of the bore immediately above, lowering a well casing into said enlarged portion of the well bore, passing a body of gravel-size material downwardly through the casing by pressure applied to a column of circulating fluid and flowing said material upwardly from the bottom of said casing into the space between the casing and the wall of said enlarged diameter portion of the well bore, said material having a specific gravity less than the specific gravity of the circulating fluid.

HARRY CALVIN WHITE.